Patented June 26, 1934

1,963,998

UNITED STATES PATENT OFFICE 1,963,998

CATALYTIC PROCESS FOR THE PRODUCTION OF BUTANOL

Arthur Whitney Larchar, Wilmington, Del., assignor to E. I. du Pont de Nemours & Company, Wilmington, Del., a corporation of Delaware No Drawing. Application November 11, 1929, Serial No. 406,531

8 Claims. (Cl. 260—156)

This invention relates to the art of producing alcohols, and more particularly to a catalytic process for the conversion of aldol to butylene glycol and butanol.

It is an object of this invention to provide a process for converting an aldehyde alcohol into the corresponding glycol. A further object is to effect the conversion of an aldehyde alcohol first to a glycol and then to the corresponding primary alcohol. A specific object is to convert aldol to 1:3 butylene glycol and butanol.

These objects are accomplished by the following invention, which comprises heating an aldehyde alcohol to an elevated temperature in the presence of hydrogen at high pressures and of a catalyst having both a hydrogenating and a dehydrating effect.

The following example is included for purposes of illustration, but is not to be regarded as a limitation.

Example.—A mixture of 250 grams of aldol and 10 grams of a nickel-chromium oxide catalyst was shaken in a suitable reaction tube at a temperature of 100-120° C. in the presence of hydrogen. The hydrogen pressure was maintained at about 1000 pounds per square inch for two hours, after which the pressure remained constant indicating that no more hydrogen was being absorbed and that the aldol had been substantially completely converted to 1:3 butylene glycol by the hydrogenation of the aldehyde group. The temperature was then raised to 250° C. and the pressure maintained at 3000 pounds. After the reaction was completed there was recovered from the tube about 239 grams of product. By subjecting this material to fractional distillation there was obtained a yield of 23% of 1:3 butylene glycol, 36% of butanol, and about 40% of unidentified products.

It will be seen from the above example that, since the formation of 1:3 butylene glycol involves hydrogenation and since the subsequent formation of butanol from 1:3 butylene glycol involves both hydrogenation and dehydration, it is necessary that the catalyst must possess both a hydrogenating and a dehydrating action.

A suitable nickel-chromium oxide catalyst, as used in the above reactions, may be prepared in the following manner. A solution containing one mol of nickel nitrate dissolved in two liters of water is heated to boiling and treated with a solution containing an equimolecular quantity of ammonium bichromate. Ammonium hydroxide is added with stirring until the mixture reacts slightly alkaline. The brick red precipitate of nickel chromate is filtered, thoroughly washed, dried, and partially reduced with hydrogen at 500-550° C. The reduced catalyst contains about 40% of elementary nickel and possesses a high activity in the liquid phase hydrogenation and dehydration of aldol.

While in the above example I have disclosed the use of a nickel-chromium oxide catalyst, there are a number of catalyst combinations which may be effectively used in the process of my invention. The principal requisite of such a catalyst is that it must contain both hydrogenating and dehydrating components. As examples of effective hydrogenating materials other than nickel may be mentioned copper, iron, and cobalt when combined with dehydrating oxides, such as those of chromium, aluminum, tungsten, molybdenum, uranium and thorium, or when in the form of dehydrating salts of such acids as boric, phosphoric and sulphuric.

In general, it may be stated that the most effective mixed catalysts are prepared by methods giving the most intimate association of the various constituents. Although I have illustrated one satisfactory method of preparation of the catalyst, I may employ other methods if desired. For example, I may coprecipitate an oxide of a hydrogenating metal and a dehydrating oxide.

The hydrogenation and dehydration reactions of my process may be carried out in any apparatus which will insure satisfactory contact between the catalyst, hydrogen, and the materials to be treated. Although I have described a batch process in which the materials are agitated together in a suitable container, the process may be made continuous by pumping the reactants over a suitable supported catalyst.

With regard to the pressures and temperatures employed, attention is again directed to the fact that the conversion of aldol to butanol involves two reactions, namely, the hydrogenation of the aldehyde group in the aldol to give 1 : 3 butylene glycol and the subsequent dehydration of the 1 : 3 butylene glycol to form butanol.

In order to obtain satisfactory hydrogenation of aldol, the temperature must be at least 100° C. and should preferably be in the neighborhood of 120° C., although it may be as high as about 200° C. The pressure of hydrogen necessary for the hydrogenation reaction must be at least 100 pounds per square inch and should preferably be above 1000 pounds.

The temperatures employed in the dehydration reaction may be as low as 200° C. and I may even use temperatures up to 300° C., although I prefer to use a temperature of 250° C. The hydrogen pressure should be at least 2000 pounds per square inch, although I may use much higher pressures, if desired. Furthermore, I may use much higher pressures than those stated for both hydrogenation and dehydration reactions, the upper limit being determined only by the strength of the apparatus in which the reaction is carried out, or the capacity of the compressing apparatus.

It is a special feature of my invention that I am enabled to convert a relatively cheap and readily available material, such as aldol, into butanol, which is an expensive and valuable compound by means of a simple, effective, and inexpensive procedure. The butanol thus formed may then be readily converted by known methods into its derivatives, for example, butyl acetate, one of the most important lacquer solvents.

No claim is made herein to the method of producing the reduced nickel-chromium oxide catalyst set forth above, inasmuch as I am not the inventor of this method. The use of basic compounds in association with the hydrogenation catalyst, to inhibit dehydration, is not intended to be included within the scope of this invention.

As many apparent and widely different embodiments of this invention may be made without departing from the spirit and scope thereof, it is to be understood that I do not limit myself to the specific embodiments thereof except as defined in the appended claims.

I claim:

1. In the process of producing butanol which comprises hydrogenating aldol at an elevated temperature and pressure followed by the hydrogenation of the reaction product at a higher temperature and a higher pressure, the step which comprises hydrogenating said reaction product at a temperature of 200° C. to 300° C. and at a pressure of at least 2000 lbs. per square inch in the presence of a catalyst comprising essentially a catalytically dehydrating oxide and a catalytically hydrogenating metal.

2. The method of claim 1 in which the catalyst is a nickel-chromium oxide composition prepared by the reduction of nickel chromate.

3. The process of claim 1 in which the catalyst contains chromium oxide and a hydrogenating metal.

4. The process of producing butanol which comprises heating aldol to a temperature of from 100° C. to 200° C. in the presence of hydrogen at a pressure of at least 1000 lbs. per square inch in the presence of a hydrogenating catalyst, then heating the reaction product at a temperature of 200° C. to 300° C. and a pressure of at least 2000 lbs. per square inch in the presence of a catalyst comprising essentially a catalytically dehydrating oxide and a catalytically hydrogenating metal.

5. The process of claim 4 characterized in that the heating during the second hydrogenation step is carried out at 200° C. to 250° C.

6. The process of claim 4 characterized in that the first hydrogenation step is carried out at a temperature of 100° C. to 120° C., and the second hydrogenation step is carried out at a temperature of 200° C. to 250° C.

7. The process of producing butanol which comprises heating 1,3-butylene glycol to a temperature of from 200–250° C. in the presence of hydrogen under a pressure of at least 2000 pounds per square inch and a nickel-chromium oxide catalyst prepared by the reduction of nickel chromate.

8. The method of producing butanol which comprises converting aldol to 1:3 butylene glycol by heating aldol to a temperature of from 100–120° C. in the presence of hydrogen at a pressure of at least 1000 pounds per square inch and a nickel-chromium oxide catalyst prepared by the reduction of nickel chromate, and thereafter raising the temperature to about 200–250° C. and the pressure to about 3000 pounds per square inch to convert the 1:3 butylene glycol to butanol.

ARTHUR W. LARCHAR.